United States Patent [19]

Salinas

[11] Patent Number: 4,926,909
[45] Date of Patent: May 22, 1990

[54] INTERSTICED NIPPLE FOR ELASTOMERIC HOSE

[75] Inventor: Philip Salinas, Aurora, Colo.

[73] Assignee: The Gates Rubber Company, Denver, Colo.

[21] Appl. No.: 462,355

[22] Filed: Jan. 2, 1990

Related U.S. Application Data

[63] Continuation of Ser. No. 368,126, Jun. 16, 1989, abandoned, which is a continuation of Ser. No. 885,061, Jul. 14, 1986, abandoned.

[51] Int. Cl.⁵ .............................................. F16L 11/10
[52] U.S. Cl. ..................................... 138/109; 138/127; 138/174; 285/149; 285/908
[58] Field of Search ............... 138/103, 109, 123, 124, 138/125, 126, 127, 138, 121, 173, 153, 172, 174, 149; 285/908, 405, 423

[56] References Cited

U.S. PATENT DOCUMENTS

| | | | |
|---|---|---|---|
| 188,446 | 3/1877 | Wakeman | 138/127 |
| 606,557 | 6/1898 | Kelso et al. | 138/127 |
| 1,630,895 | 5/1927 | Herbst | 285/149 |
| 1,847,218 | 3/1932 | Lamb | 285/149 |
| 2,032,297 | 2/1936 | Mikulasek | 285/908 |
| 2,246,404 | 6/1941 | Ross | 285/908 |
| 2,273,398 | 2/1942 | Couty et al. | 285/908 |
| 2,305,644 | 12/1942 | Stone | 138/127 |
| 2,750,210 | 6/1956 | Troydon et al. | 285/149 X |
| 2,882,072 | 4/1959 | Noland | 138/138 |
| 3,412,628 | 11/1968 | Gain | 138/121 |
| 3,461,531 | 8/1969 | Gain | 138/173 |
| 4,323,089 | 4/1982 | Radono et al. | 138/153 X |
| 4,345,624 | 3/1982 | Rider | 138/172 X |
| 4,547,193 | 10/1985 | Rydell | 138/127 X |

*Primary Examiner*—James E. Bryant, III
*Attorney, Agent, or Firm*—H. W. Oberg, Jr.; C. H. Castleman, Jr.

[57] ABSTRACT

A fitting for installing on the terminus of large scale industrial hoses and method of making it and installing it, in which two annular steel rings are welded onto a cylinder formed of expanded metal, which subassembly is then mounted over an extruded rubber tube and is then wrapped with a friction layer of rubber, a braided textile reinforcement layer, steel cable reinforcement, and a wrapped or extruded rubber outer cover. A hump is built up over the annular ring welded on closest to the end of the expanded metal cylinder, and a flange is then butted up adjacent to this hump to effect installation of the end of the hose. During curing, rubber freely flows through the expanded metal cylinder, securely embedding the fitting within the hose.

12 Claims, 2 Drawing Sheets

INTERSTICED NIPPLE FOR ELASTOMERIC HOSE

This is a continuation of Ser. No. 07/368,128 filed June 16, 1989, abandoned, which is continuation of Ser. No. 885,061, filed July 14, 1986, abandoned.

BACKGROUND OF THE INVENTION

This invention pertains to a fitting for a hose article and more particularly to a fitting for the end portion of a hose, which is solidly embedded in the wall of the hose.

In hoses, especially large industrial hoses, some type of fitting has to be installed on the end of the hose in order to connect it to either another hose or to a pipe, a valve, or some other piece of plumbing. One way of achieving contact and connection with a hose end is to use some sort of a flange arrangement. A flange is usually some sort of rim that projects outwards from a pipe or tube or hose at a right angle, giving the appearance of a collar. Often, holes are bored into the flange, which are lined up with holes that have been bored into another flange on the fixture that the hose is to be connected to, and then bolts are inserted through the holes that have been lined up in this way. When the bolts are tightened down, a seal is formed between the end of a hose and whatever other fixture the hose is thus attached to.

It has been a common practice in manufacturing larger industrial hoses to build up the end-most portion of the hose to be thicker than the rest of the hose, and therefore form a shoulder. This shoulder is useful in acting as a stop against which the flange can get a good grip on the hose. The problem with this arrangement is that after the flange has been mounted on the hose and is pushed up tight against the shoulder and is bolted onto the neighboring flange, that whenever the hose flexes, a great deal of stress will tend to concentrate on the area just behind the flange on the hose. This results in premature cracking and failure of the hose in this critical area just behind the shoulder and the flange. Therefore, ways were sought-after to move this area of stress farther away from the end area of the hose.

The shoulder at the end of the hose is usually built up by attaching a circular ring onto one of the inner layers of the hose, and then applying more layers of rubber over the inner layers of rubber and the ring as well, so as to build up the shoulder. It was realized that if the ring were solidly mounted onto a cylinder to fit over the inner layers of rubber, and then if, outer layers of rubber were applied over the ring and cylinder combination, then the area of stress would be moved away from the very end of the hose and the stress would be distributed along the length of the cylinder. This tended to reduce premature failure of the hose by cracking at the end portion behind the flange.

This solution had its own problems, however. Usually, the cylinder (or "nipple" as it is more properly referred to) would be made of metal. It is very difficult to obtain a good adhesive bond between rubber and metal, so that a new mode of failure emerged: the rubber would blister away, and separate from, the metal of the nipple. Therefore, a need arose for a nipple that could be seated within a hose having a ring structure on it to provide the basis for a shoulder to mount a flange on, and which could be so firmly anchored into the walls of the hose as to minimize separation of the bond between the nipple and the walls of the hose, and yet be economical to manufacture and use. The present invention is a solution to these longfelt needs.

SUMMARY OF THE INVENTION

Generally, the invention is a nipple fitting for the terminus of an elastomeric hose article comprising a nipple, and a nipple end bead, with the nipple being defined by a cylinder whose wall is made of a grid of material having a plurality of interstices therein, and the nipple end bead is a ring, which is mounted circumferentially around the nipple.

More specifically, and in one of the more preferred embodiments of the invention, the cylinder defining the nipple is made of expanded metal. Toward one end of this cylinder of expanded metal, a ring, preferably an annular ring, is welded on to form the end bead. It is the end bead that will subsequently form the basis for the build-up of rubber and reinforcement material that will form the shoulder on the end of the hose upon which the flange can be mounted. The expanded metal provides many interstices through which a viscoelastic polymer, such as rubber, can flow during a cure process after a layer of rubber on the inner surface of the nipple and a layer of rubber on the outer surface of the nipple are in place.

The objects of this invention are to provide a nipple that will withstand high pressures and resist being blown out of or torn out of the end of a hose. Another object is to provide for a nipple that will distribute stresses along its body so that stresses will not be concentrated in one place and tend to lead to premature failure of the hose article. Another object of the present invention is to provide for a nipple fitting that is relatively inexpensive to manufacture. Yet another object of the present invention is to provide for a nipple fitting capable of being used in large industrial hoses that carry mining slurry, and not be subject to premature wearout due to the pounding nature of mining slurry that is being transported within a hose.

This invention features a nipple, which in its most preferred form, is made of expanded metal, which has had welded onto its end a nipple end bead of sufficient thickness to be used to build up a shoulder on the end of the hose article. Another feature of the present invention is that after a layer of elastomer is applied to the inside of the nipple, and a layer of elastomer is applied to the outside of the nipple, then during cure, the elastomer will freely flow through the interstices of the nipple, thereby firmly embedding the entire nipple in the now continuous mass of elastomer.

The present invention has the advantage of being capable of being firmly embedded in a cured elastomeric hose and thus being capable of withstanding extremely high pressures before being blown out or torn out of the end of the hose article. Another advantage of the present invention is that the use of perforated or expanded metal grid or the like decreases the costs of fabricating the cylinders that make up the body of the nipple. Yet another advantage of the present invention is that it is less likely to wear out when it is used in an industrial hose carrying mining slurry. This is so since when the mineral agglomerates of the slurry collide with the inner hose wall in the area of the nipple, there is a higher degree of elastic "give", as compared to a solid metal or solid polymer nipple wall, which will not give, and which will thus be more subject to premature failure by cracking under the stresses imposed by collisions with the agglomerates. Still another advantage of the present invention is that the nipple is capable of flexing after it has been embedded in the hose article to a greater degree than a solid nipple would, and therefore, more evenly distributes tensional, compressional, and torsional stresses along a much larger area of the hose article instead of concentrating them at one point, which is a leading cause of premature hose failure.

DETAILED DESCRIPTION OF THE DRAWINGS

Figure 1:
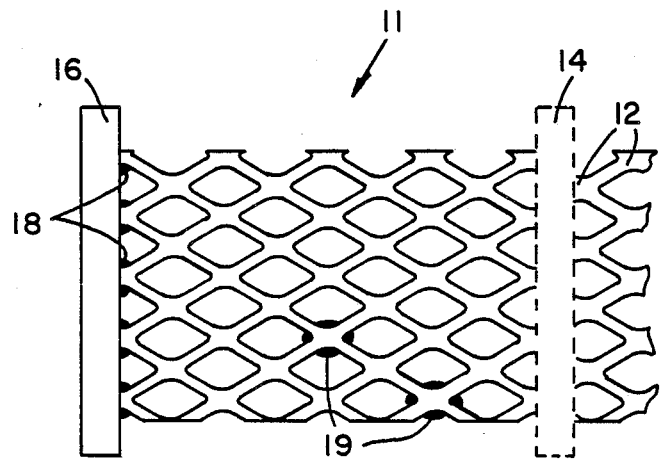
FIG. 1 is a sideview of the nipple assembly showing a front bead, an optional back bead, and a cylindrical body of the nipple itself, made of a material formed into a grid.
Figure 2:
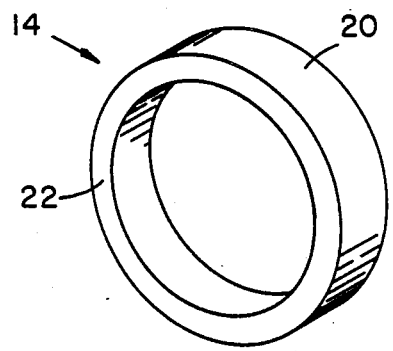
FIG. 2 is a perspective view of a nipple bead, which can be the end bead or the optional back bead.

Turning first to FIG. 1, there is seen in cross section the actual intersticed nipple shown generally at 11. It basically consists of two subcomponents, and in a more preferred embodiment, uses a third subcomponent. Firstly, at 12 there is the nipple that has the shape of a cylinder. The walls of the cylinder that define the nipple is made up of a grid of some type of material that will have many interstices or holes in it. In the most preferred embodiment, this material is expanded metal. Alternatively, it can be a cylinder that was punctured or had many holes bored through its wall. As it will be readily appreciated by those skilled in the art, this material could be any suitably rigid screen work or mesh work. At 16, there is shown the nipple end bead. The end bead, shown more clearly in the perspective view in FIG. 2, is a ring and most preferably is an annular ring. Such an annular ring will have well defined rear and front faces shown at 22 and a well defined rim face shown at 20. Returning to FIG. 1, the nipple end bead 16 is shown mounted circumferentially on the cylinder shaped nipple 12. Most preferably, the nipple end bead is mounted as close as possible to the end of the nipple 12. The nipple end bead 16 may be fastened onto the nipple 12 by one or more welds illustrated at 18. Furthermore, for a hose expected to take extremely large pressures or stresses, additional welds may be added at junctures where the grid work intersects on the nipple, as illustrated at 19. Moving further along the body of the nipple 12, there is seen a nipple back bead 14. The nipple back bead is not absolutely essential, but is included in a more preferred embodiment of the invention. The nipple back bead will usually have an identical construction to the nipple end bead described above. The nipple back bead may be circumferentially mounted anywhere along the cylinder defining the nipple 12. In most cases, it will be preferred that the nipple end bead 16 and the nipple back bead 14 not be mounted adjacent to each other.

Figure 3:
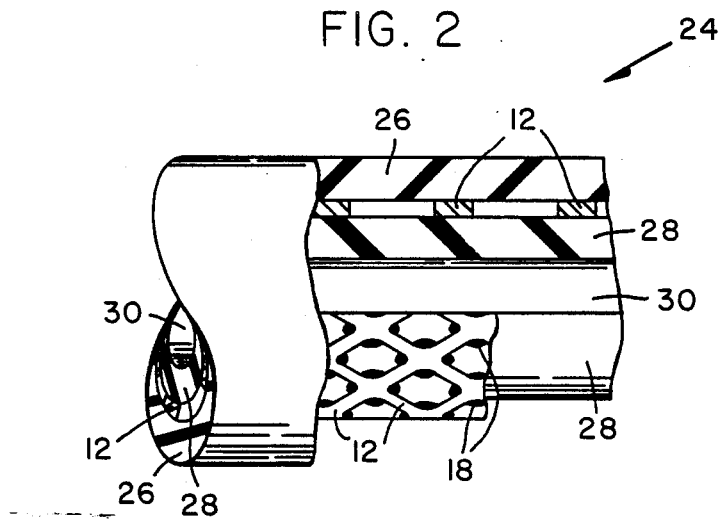
FIG. 3 is a partial cutaway, partially telescoped, and partial cross sectional view of the nipple embedded in inner and outer layers of elastomer.

Turning now to FIG. 3 there is shown in partial cutaway, partial telescoped, and partial cross sectional views, the intersticed nipple embedded in between inner and outer layers of elastomer prior to curing. The nipple 12 has been seated in a cap-like manner over an inner layer of elastomer 28. There is also wound over the nipple 12 an outer elastomer layer 26. Thus it can clearly be seen that the nipple is sandwiched in between the inner 28 and outer 26 layers of elastomers. Within the inner layer of elastomer 28, there is the hose article conduit 30 through which the commodity will flow.

Figure 4:
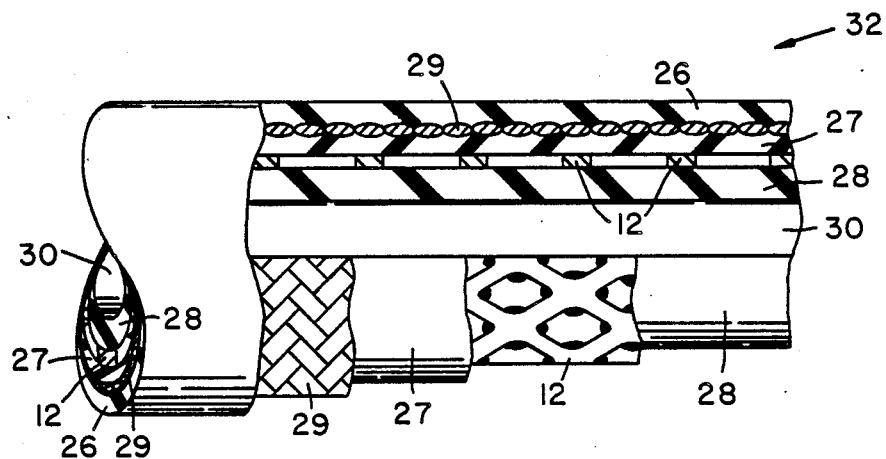
FIG. 4 is a partial cutaway, partially telescoped, and partial cross sectional view of a more preferred embodiment of the invention, showing the nipple embedded in between inner and outer layers of elastomer, there also being present additional intermediate layers of elastomer and one or more layers of reinforcment.

Turning now to FIG. 4, there is again in partial cutaway, partial telescoped, and partial cross sectional views a preferred embodiment of a hose article with the intersticed nipple embedded therein. An inner layer of elastomer 28 has been capped with the nipple 12. Over the nipple 12, there has been applied at least one intermediate friction layer of elastomer 27. Over the intermediate friction layer 27 there has applied at least one reinforcement member 29. In most cases, the reinforcement member 29 will be a woven or braided textile material. Over the reinforcement layer 29 there is shown the outer elastomeric cover 26, which may be composed of multiple layers of elastomer.

Figure 5:
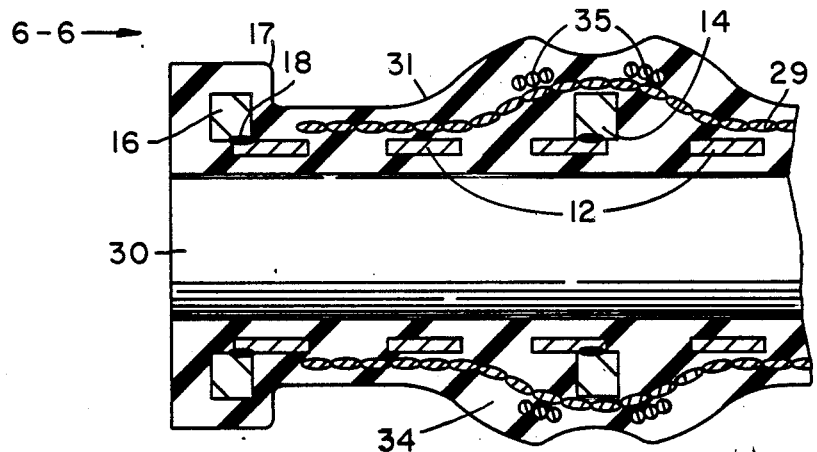
FIG. 5 is a cross sectional view of a preferred embodiment of the invention, showing the nipple fully embedded in between inner and outer layers of elastomer that have now been fully cured and are continuous, there also being shown various layers of fabric and metal reinforcement as well as an overall silhouette of the finished hose article.

At FIG. 5 there is shown in cutaway cross sectional view a most preferred embodiment of the hose article containing the embedded intersticed nipple fitting, after curing has been completed. From the hose article interior conduit 30 to its exterior 31, it can be seen that after curing, the cured elastomer 34 has flowed around and through all the available interstices of the nipple 12. Likewise, it has completely flowed around the nipple end bead 16 and the nipple back bead 14. As the reinforcement layer 29 was laid down over the hose article during construction, it formed what can be seen in cross section to be a humped area over the nipple back bead 14. Over the reinforcement layer 29, there were applied multiple strands of a cable reinforcement member 35, which had the function of tying the reinforcement layer 29 down as tightly over the contours of the nipple 12 and nipple back bead 14 as possible. As layers of elastomeric material were applied over the nipple end bead 16, the shoulder-like area shown generally at 17 was formed. It will be recalled from the discussion of the background of the invention that a shoulder-like area is needed in hose articles where connection is to be made by means of mounting a flange onto the hose article. It will readily be appreciated by those skilled in the art that where a sizable enough shoulder 17 has been built up over the end of the hose article, that this will provide a useful and effective upright structure against which the flange can be mounted and grip the hose article. It should also be readily apparent from FIG. 5 that the entire structure of the nipple is effectively embedded within a continuous, cohesive agglomerated and agglutinated mass of cured elastomer, which will tend to minimize adhesion problems between the nipple and the elastomer since each individual piece of the grid work making up the nipple is itself surrounded by solid elastomer. This structure is superior to having a solid cylinder in which anchoring must rely on adhesion between the outside of the cylinder and elastomer and adhesion between the inside of the cylinder and elastomer and where there is simply no opportunity for the elastomer of the inner and outer layers to meet and bond with each other to become a unified whole.

Figure 6:
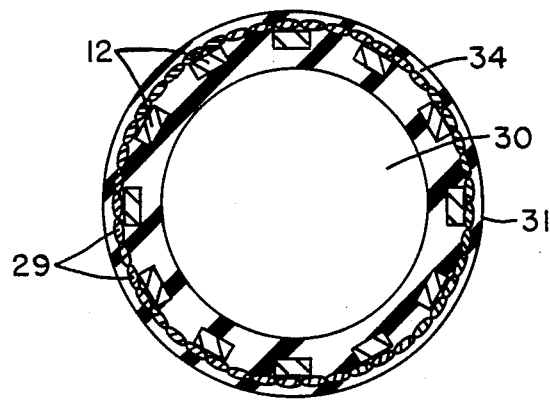
FIG. 6 is a cross sectional view taken along line 6—6 of FIG. 5, showing the nipple embedded in between inner and outer layers of elastomer after full cure so that the elastomer is continuous, along with a layer of reinforcement being illustrated.

Finally, turning to FIG. 6, there is shown along line 6—6 of FIG. 5, an end-on cross section of a portion of the cured hose article having the intersticed nipple embedded therein. Again, from the hoses' interior conduit 30 to its exterior surface 31, it can be seen that cured elastomer 34 has completely flowed around each member of the grid work of the nipple and through all of the interstices associated with the grid work.

Having described in great detail the drawings, there will now be described the preferred embodiments of the invention. As stated before, the intersticed nipple fitting is basically comprised of nipple, a nipple end bead, and in a more preferred embodiment, a nipple back bead. The cylinder shaped nipple is expanded metal, preferably steel, which makes up a grid that has a plurality of interstices in it. Frequently, the nipple has been welded together to form its cylindrical shape. As those skilled in the art know, expanded metal tends to have a regularly repeating diamond shaped pattern in which each diamond shaped segment has a pair of opposed acute angle corners and a pair of opposed obtuse angle corners. The nipple can be formed into its cylindrical shape with the diamond shape pattern either oriented such that the opposed acute angle corners are aligned substantially parallel to the axis of the cylinder defining the nipple, or it can be oriented such that the opposed obtuse angled corners are aligned substantially parallel to the axis of the cylinder defining the nipple.

The nipple end bead, which will generally be an annular ring, should have an interior cylindrical surface that is substantially the same circumference as that of the nipple upon which the nipple end bead is circumferentially mounted.

Likewise, a nipple back bead will be circumferentially mounted on the nipple. Ordinarily, the nipple end bead and the nipple back bead will be mounted on the nipple so that each bead's plane is substantially perpendicular to the axis of the cylinder defining the nipple.

The nipple need not necessarily be made of a metal. It can be made of a polymer material or a composite material, particularly epoxy reinforced with a fiberglass. Whatever the material that is picked for the nipple, a key criterion is that the plurality of interstices in the grid work are such that the interstices are large enough to permit viscoelastic flow-by of the elastomeric polymer during the curing process so as to result in the nipple being substantially embedded within the cured polymer which will become an agglomerated cohesive mass. The polymer chosen for this will usually be rubber.

Constructing an intersticed nipple fitting in accordance with the descriptions given above results in a unique method of making such a fitting and a unique product made in accordance with that method. After having constructed such a fitting, it is installed in a cap-like manner over the terminus of an elastomeric polymer tube that has been extruded by means well known to those skilled in the art. During construction, at least one intermediate friction layer of elastomeric polymer may be applied by sandwiching it in between the tube and the cover, and covering the nipple, the nipple end bead, and the nipple back bead. Furthermore, one or more textile reinforcement layers may be applied, sandwiching them in between the tube and the cover and covering the nipple, the nipple end bead, and the nipple back bead. Over such a reinforcement member, optionally there may be added a steel cable reinforcement member wrapped circumferentially over the nipple back bead and sandwiched between the nipple and the cover. After having completed such an assembly, it is then allowed to cure. It is during the curing process that the elastomer, through viscoelastic flow-by, will flow through the interstices of the nipple and between any other voids created in the subassembly to form one cohesive agglomerated agglutinated mass in which the entire nipple subassembly is substantially seated and embedded. This is all accomplished through means well known to those skilled in the art of hose building. Following the steps in constructing a hose article with a fitting embedded therein according to the description given above, will result in a novel and unique product, as well as a novel and unique method of making it.

Having completed construction of the invention, it can be put to use by mounting a flange means onto the terminus of the hose so that it can then be used to convey commodities. Typically, a flange having a hinge mounted in it so that it will open up into two "C" shape sections is used, the flange opened and then closed over the hose article, and made to slide until it is butted up against the shoulder on the terminus of the hose article.

It is then mounted by means of inserting bolts through holes bored into the flange into another flange mounted either onto another section of hose or onto some other section of plumbing or tubing that one desires to have the hose connected to. Alternatively, the nipple end bead can be selected so as to be sufficiently thick in height that after construction of the hose, a shoulder has been formed on its terminus that sticks out perpendicularly from the body of the hose far enough to permit boring of holes through the shoulder on an axis parallel to the axis of the hose thus making the shoulder itself the flange instead of installing a separate flange.

It is thought that the intersticed nipple for elastomeric hose and method of the present invention and many of its attendant advantages will be understood from the foregoing description, and it will be apparent to those skilled in the art that various changes may be made in the form, construction, and arrangement of the parts thereof without departing from the spirit and scope of the invention, or sacrificing all its material advantages. The forms herein described are merely preferred embodiments, and the description herein should not be construed or interpreted as the only embodiments. Although this description has largely discussed application of this invention to large scale industrial hoses, this is only one major application of the technology, and other applications to the production of other products are not intended to be precluded. The following claims should therefore be interpreted as broadly as is reasonable.

What is claimed is:

1. In a cured elastomeric hose and fitting assembly of the type with an elastomeric tube and joined together by a curing process, an elastomeric cover surrounding the tube, and the fitting with an annular nipple end bead attached near an end of a substantially cylindrically shaped nipple embedded in a terminus of the hose between a portion of the tube and cover, and wherein the improvement comprises:
   the nipple of an expanded metal that defines a wall with a grid and a plurality of interstices with regularly repeating, substantially diamond shaped openings and which define a means for receiving viscoelastic flowby of a portion of the elastomeric tube and cover during said curing process and wherein the elastomer flowby is disposed in the interstices.

2. The hose assembly of claim 1, wherein the end bead is fixably mounted circumferentially on an end of the nipple and an annular nipple back bead is fixably mounted circumferentially on the nipple spaced apart from said nipple end bead.

3. The assembly as claimed in claim 2, in which the elastomeric tube and cover form one agglomerated and agglutinated cohesive mass, the grid of the nipple wall, the nipple end bead, and the nipple back bead being substantially embedded within the mass.

4. The assembly as claimed in claim 2, and further comprising at least one textile reinforcement layer sandwiched in between the tube and cover, and covering the nipple, the nipple end bead, and the nipple back bead.

5. The assembly as claimed in claim 2, and further comprising at least one intermediate friction layer of elastomer, sandwiched in between the tube and the cover, and covering the nipple, the nipple end bead, and the nipple back bead.

6. The assembly as claimed in claim 2, and further comprising a steel cable reinforcement member, wrapped circumferentially substantially over the nipple back bead and sandwiched in between the nipple and the cover.

7. The assembly as claimed in claim 2, in which the nipple end bead has sufficient thickness and height to form a shoulder on the terminus of the hose article capable of having a flange mounted thereon.

8. The assembly as claimed in claim 2, in which the nipple end bead has sufficient thickness and height to form a shoulder on the terminus of the hose article that defines a flange.

9. In a fitting for a cured elastomeric hose of the type with an annular nipple bead attached near an end of a substantially cylindrically shaped nipple member and joined together by a curing process wherein the improvement comprises:
   the nipple member of an expanded metal that defines a wall with a grid and a plurality of interstices with regularly repeating, substantially diamond shaped openings and which define a means for receiving viscoelastic flowby of an elastomer forming part of said hose.

10. The fitting of claim 9 wherein said bead is fixedly secured to said member by at least one weld.

11. The fitting of claim 9 wherein a second annual bead is mounted circumferentially on said member in a spaced-apart relationship and fixedly secured to said member.

12. The fitting of claim 9 wherein one of said two annular beads in mounted on an end of said member and the other annular bead is mounted intermediate the length of said member.

* * * * *